United States Patent
Ahyow

(10) Patent No.: US 12,441,465 B2
(45) Date of Patent: Oct. 14, 2025

(54) ANTI-BACKLASH FLIGHT CONTROL ACTUATOR SYSTEM

(71) Applicant: Archer Aviation Inc., San Jose, CA (US)

(72) Inventor: Bernard Ahyow, Irvine, CA (US)

(73) Assignee: Archer Aviation Inc., San Jose, CA (US)

( * ) Notice: Subject to any disclaimer, the term of this patent is extended or adjusted under 35 U.S.C. 154(b) by 49 days.

(21) Appl. No.: 17/913,784

(22) PCT Filed: Mar. 26, 2021

(86) PCT No.: PCT/US2021/024340
§ 371 (c)(1),
(2) Date: Sep. 22, 2022

(87) PCT Pub. No.: WO2021/221838
PCT Pub. Date: Nov. 4, 2021

(65) Prior Publication Data
US 2024/0208645 A1     Jun. 27, 2024

Related U.S. Application Data

(60) Provisional application No. 63/000,682, filed on Mar. 27, 2020.

(51) Int. Cl.
*B64C 27/72*     (2006.01)
*B64C 27/625*    (2006.01)
*B64C 27/68*     (2006.01)

(52) U.S. Cl.
CPC ............ *B64C 27/72* (2013.01); *B64C 27/625* (2013.01); *B64C 27/68* (2013.01); *B64C 2027/7205* (2013.01)

(58) Field of Classification Search
None
See application file for complete search history.

(56) References Cited

U.S. PATENT DOCUMENTS

| | | | |
|---|---|---|---|
| 8,197,205 B2 * | 6/2012 | Rudley | B64C 27/72 |
| | | | 416/158 |
| 8,511,192 B2 * | 8/2013 | Hirtt | G05B 19/404 |
| | | | 318/630 |
| 10,228,054 B1 | 3/2019 | Wittig | |
| 11,194,120 B2 * | 12/2021 | Honjo | G02B 7/102 |

(Continued)

FOREIGN PATENT DOCUMENTS

| | | |
|---|---|---|
| EP | 2372476 | 11/2013 |
| KR | 10812755 | 3/2008 |

(Continued)

OTHER PUBLICATIONS

International Search Report dated Nov. 16, 2021, from related PCT application No. PCT/US2021/024340. 9 pages.

*Primary Examiner* — Juan G Flores
(74) *Attorney, Agent, or Firm* — Finnegan, Henderson, Farabow, Garrett & Dunner, LLP

(57) ABSTRACT

A rotor blade pitch actuator has a first and second motor configured to control the rotor blade pitch. An actuator control system is configured to drive the first and second motor such that backlash is either eliminated from the system or minimized to an acceptable level.

13 Claims, 12 Drawing Sheets

(56) References Cited

U.S. PATENT DOCUMENTS

| | | | | |
|---|---|---|---|---|
| 2009/0269199 A1* | 10/2009 | Rudley | ............... | B64C 27/72 |
| | | | | 416/155 |
| 2011/0237386 A1* | 9/2011 | Hirtt | ............... | G05B 19/404 |
| | | | | 477/3 |
| 2020/0301096 A1* | 9/2020 | Honjo | ............... | G03B 5/00 |

FOREIGN PATENT DOCUMENTS

| | | |
|---|---|---|
| KR | 101654505 | 9/2016 |
| KR | 20170026432 | 3/2017 |

\* cited by examiner

FIG. 11

3001 Receive command to actuate rotor blade pitch.

3002 Sense position of motors (or alternatively sense a force on motors).

3003 Compute commands for first and second motor, using value sensed in step 2002, configured to command a first motor to actuate control surface, while a second motor maintains sufficient opposing force to eliminate or minimize backlash.

3004 Command a first motor to actuate control surface, while a second motor maintains sufficient opposing force to eliminate or minimize backlash.

3005 Sense position of motors (or alternatively sense a force on motors).

ANTI-BACKLASH FLIGHT CONTROL ACTUATOR SYSTEM

PRIORITY CLAIM

This application claims priority to PCT application serial no. PCT/US21/24340 (filed Mar. 26, 2021), which claims priority to U.S. provisional application having Ser. No. 63/000,682 (filed Mar. 27, 2020). These and all other extrinsic material discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is aircraft control.

BACKGROUND

Rotors can provide thrust, lift, and control for an aircraft. Thrust, lift, and control are all affected by rotor blade pitch—thus, ability to control blade pitch is critical to controlled flight.

In this application, the term rotor will be used out of convenience—the term rotor should be understood to include propellers despite any historical distinction between rotors and propellers.

In many aircraft, the ability to control the pitch of the rotor blade is critical for aircraft control—pitch of a rotor blade refers to the angle of the chord of the blade relative to the path of airflow over the rotor blade. In general, the amount of thrust produced by a rotor will increase as the effective blade pitch of the rotor blades increase. In traditional helicopters, the blade pitch of each rotor blade is used not only to control the magnitude of thrust, but also to control the attitude of the aircraft through the application of cyclic control. Cyclic control refers to controlling the rotor blades such that a different blade pitch is affected at different points in the rotor blade's revolution. Blade actuation is even more important for aircraft comprising individual blade control—individual blade control is the ability to control each rotor blade independent of the other rotor blades of a rotor system.

Thus, command authority of rotor blade pitch can be critical in aircraft using either rotors or propeller, especially in aircraft comprising cyclic blade control.

SUMMARY

Backlash in rotor blade pitch control systems can be extremely problematic. For example, rapidly reversing forces sometimes experienced by a rotor—such as the forces that occur during blade stall phenomenon—can have catastrophic results when there is significant backlash present in the blade pitch control system.

Some embodiments described herein provide ways to use electric motors to control the blade pitch of a propeller while minimizing or eliminating backlash. Some embodiments disclosed herein may have several beneficial attributes including: minimal levels of backlash; lower initial manufacturing costs; lower maintenance costs; greater degrees of freedom for designers to choose amongst motors; a simple way to use multiple motors; improved reliability; simplicity; and greater safety than other systems.

BRIEF DESCRIPTION OF THE DRAWINGS

FIG. 11 illustrates a flow chart describing one embodiment of a method for controlling an anti-backlash blade actuator system.

DETAILED DESCRIPTION

Figure 1:
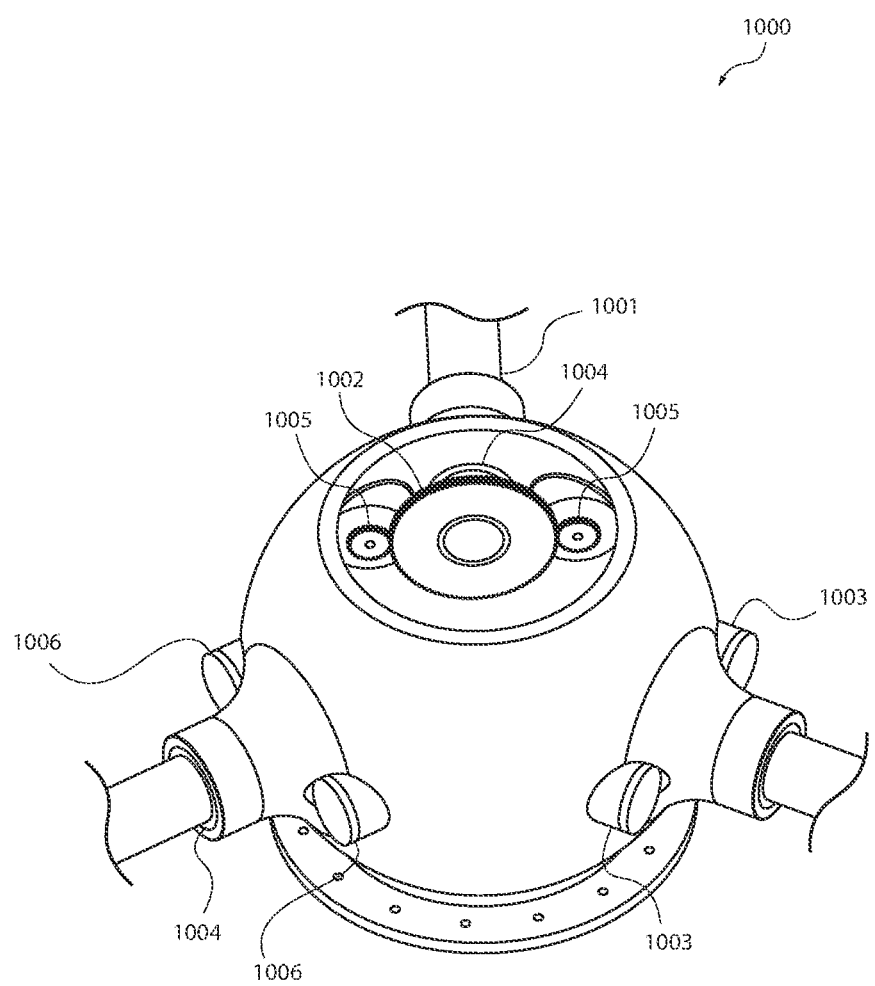
FIG. 1 illustrates an embodiment of a rotor system.

Traditionally, rotor systems equipped with cyclic blade control used a swashplate system to control blade pitch. However, swashplate systems cannot control the blade pitch of a single rotor blade independent of the other rotor blades of a rotor system without incorporating additional complexities.

Due to the importance of blade pitch to aircraft dynamics, a system for actuating the blade pitch that results in high precision, speed, rigidity, and high degrees of control over each blade independent of the other blades in the rotor or propeller assembly is desirable. Implementing blade pitch control actuation systems has several challenges, including: space limitations; weight; reliability; and backlash.

In independent blade control systems, it is often desirable to arrange blade pitch actuators such that blade pitch actuators rotate with hub as the hub rotates relative to the airframe. However, if the actuators are placed on the rotating side of a rotor hub assembly, weight and space considerations become especially important. The use of electromechanical linear actuators is possible; however, electromechanical linear actuators take up a large amount of space and are generally less reliable than electric rotary motors and are expensive.

Thus, it may be desirable to use rotary motors-either electric or other—to control blade pitch. However, using rotary motors to actuate blade pitch has its own set of problems. Since, there may be a significant amount of torque on a rotor blade around about the blade pitch axis, any motor implementation will need to provide a significant amount of torque to control blade pitch. To implement a direct drive motor with sufficient torque, appropriately sized motors would be relatively large and heavy; thus, designers would be limited in their choice of motors. A gear reduction system may allow for use of a smaller motor. However, most gear reduction systems can introduce problematic backlash into the system.

Backlash in rotor blade pitch control systems can be extremely problematic. For example, rapidly reversing forces sometimes experienced by a rotor—such as the forces that occur during blade stall phenomenon—can have catastrophic results when there is significant backlash present in the blade pitch control system. Although traditional helicopter rotors are typically subject to more complex forces than traditional airplane propellers, backlash is still problematic in traditional airplane propeller systems. Any backlash makes the system control more difficult. Even on a traditional airplane propeller, there may be regions of the aircraft's operation envelope in which the blade pitch moment reverses (reverse pitch or inflow disturbances etc.). That is one reason why variable pitch propellers often have counterweights to control blade pitching moment and allow feathering in case of governor failure.

Some embodiments described herein provide ways to use electric motors to control the blade pitch of a propeller while minimizing or eliminating backlash. Some embodiments disclosed herein may have several beneficial attributes including minimal levels of backlash, lower initial manufacturing costs, lower maintenance costs, greater degrees of freedom for designers to choose amongst motors, a simple way to use multiple motors, improved reliability, simplicity, and greater safety than other systems.

High degrees of safety on flight critical components such as prop-rotor pitch actuators are necessary on civilian aircraft. In general, as redundancy in a system increases, the degree of safety will also increase. Hence, the redundant motor configuration of some of the currently disclosed embodiments will exhibit favorable safety characteristics.

In one embodiment, illustrated in FIG. 1, a first motor 1003 is configured to drive a first blade 1001 to change a pitch angle of the blade. The first motor 1003 is connected to a first pinion gear 1005. The first pinion gear 1005 drives a ring gear 1002. A second motor 1003 drives a second pinion gear 1005 which in turn drives the same ring gear 1002. The blade 1001 is connected to blade pitch axis bearing 1004. There may be more than one blade pitch axis bearing per blade. The bearings may be of any type known in the art. Attached to each of the first and second motor 1003 may be motor rotary position sensors 1006. Encoders may be used in some embodiments, while in other embodiments other types of sensors may be used such as a resolver, a hall effect sensor, RVDT's or any other suitable tool for sensing rotary position of the motor. In other embodiments, a back emf from each of the first and second motor 1003 may be sensed. Still other embodiments may use any combination of sensors and sensing methods. In some embodiments, the rotary position sensor could be located at a position other than on the motor. For example, the sensor could be on the blade side of the gear reduction system.

The first and second pinion gears as well as the ring gear can be of any type including spur gears, helical gears, miter gears, worm gears, screw gears, rack and pinion gears, beveled gears, or any other type of suitable gear. Additionally, in some embodiments pulleys, belts, chains, smooth gears or wheels, a harmonic drive, cables, another known cycloidal reduction, or any other reduction system may be used.

Figure 2A:
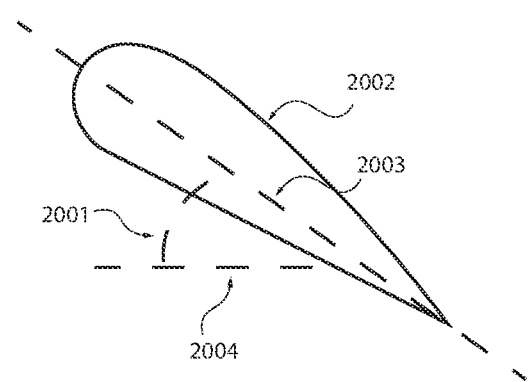
FIG. 2A illustrates a diagram of blade pitch.

FIG. 2A illustrates blade pitch angle 2001 of rotor blade 2002. The blade pitch angle 2001 is the angle between rotor blade chord line 2003 and plane of rotor velocity 2004. A blade pitch actuation system may be used to control the blade pitch angle 2001.

Figure 2B:
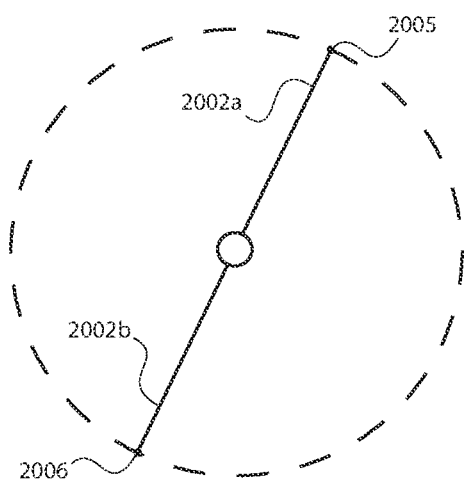
FIG. 2B illustrates a simplified diagram of a rotor system's rotational path.

FIG. 2B is a simplified diagram included for the purpose of illustrating how different blade pitch control systems can affect rotor blade pitch trajectories—that is the rotor blade pitch angle as the rotor blade as a whole rotates about the azimuth. In a system with cyclic blade control, rotor blades 2002a and 2002b can have a first pitch angle at point 2005 and a second pitch angle at point 2006. At a given time, the blade pitch angle of rotor blade 2002a can be different from the blade pitch angle of rotor blade 2002b.

If the FIG. 2B is used to describe a traditional swashplate rotor system, the rotor blade trajectory will be limited to one sinusoidal period per rotor revolution. If the system of FIG. 2B corresponds to a rotor system equipped with an individual blade control (IBC) system, the blade pitch trajectory of each blade can be mapped to the azimuth as desired. Swashplate systems equipped with higher harmonic control (HHC) are capable of blade pitch trajectory control—although the blade pitch trajectory control is limited.

Figure 3B:
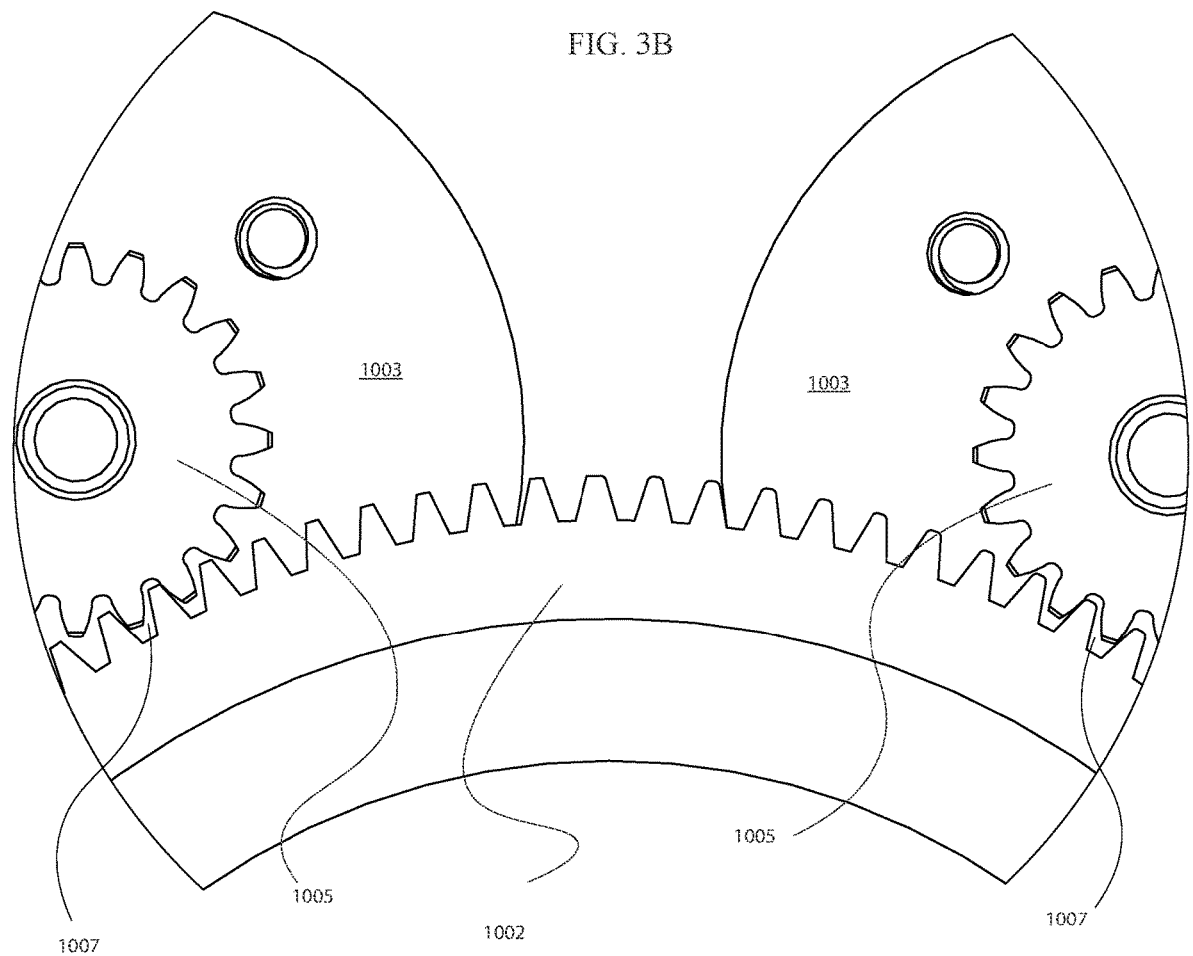
FIG. 3B illustrates a detail view of aspects of the embodiment of FIG. 3A.
Figure 3A:
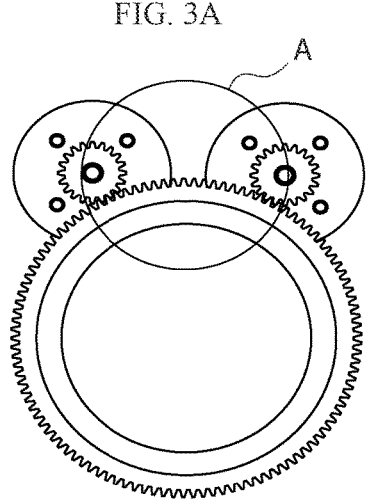
FIG. 3A illustrates an embodiment of a blade pitch actuator system.
Figure 4:
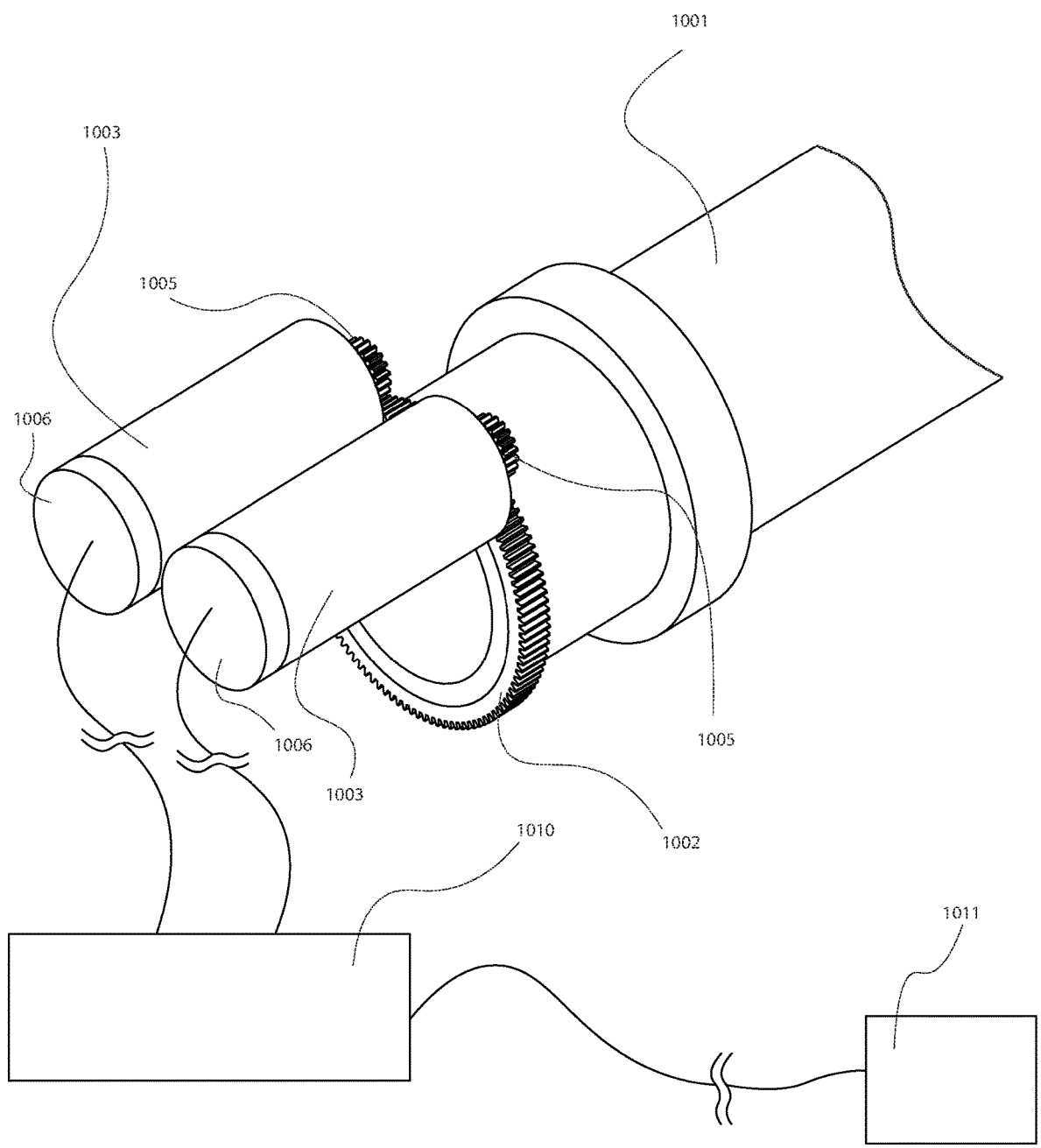
FIG. 4 illustrates an embodiment of a blade pitch actuator system including an actuator control system.

Actuator control system 1010, shown in FIG. 4, is configured to drive the first and second motor 1003 such that a backlash free drive system is created. As illustrated in FIG. 3A and FIG. 3B, actuator control system 1010 commands the first motor 1003 to drive the first gear 1005 such that gear 1005 applies a first force on ring gear 1002 in a first direction. Actuator control system 1010 commands the second motor 1003 to drive the second gear 1005 such that the second gear 1005 applies a second force on the ring gear in a second direction. In one embodiment the first and second direction are opposite, for example the first direction may be counterclockwise, and the second direction may clockwise. The first force may be greater than the second force or vice versa. Thus, a first backlash gap 1007 and a second backlash gap 1007 will be on opposite sides of each other. For example, the first backlash gap may be on the clockwise side of the respective ring gear tooth and the second backlash gap may be on the counterclockwise side of the respective ring gear tooth. Thus, the backlash is removed from the system or minimized to an acceptable level as each of the motors is always applying a sufficient force in either direction against ring gear 1002 to either remove backlash or minimize backlash to an acceptable level. The control system can employ known methods as described in U.S. Pat. No. 6,580,244 B2 to Tanaka and US patent application 2011/0237386 A1 to Hirtt, incorporated herein, by reference, in their entirety.

In some embodiments, actuator control system 1010, may command the first motor 1003 to drive blade 1001 and the second motor 1003 to merely apply opposing force—relative to the force of the first motor—to the ring gear. The force applied by the second motor 1003 may be slight relative to the force applied by the first motor 1003 and may serve merely to minimize or eliminate backlash from the system. Alternatively, actuator control system 1010 may command the rotor to rotate the opposite direction by commanding the second motor to apply a second force which is greater than the first force provided by the first motor. When the motor is rotating in the latter described direction, the first motor may now apply a force just sufficient to maintain sufficient force in the opposite direction of the second motor in order to minimize or remove backlash from the system. It should be understood that various configurations could be implemented in order to accomplish specific system design and redundancy goals.

Blade 1001 may be constructed of metal, carbon fiber, fiber glass, wood, plastic, resin, any other known composite, or any other suitable known material. Ring gear 1002 may be constructed of metal, plastic, composite, resin, wood, or any other known material. Further, ring gear 1002 may be heat treated to provide better wear resistance in addition to other desirable characteristics. Any other suitable treatment or surface treatment could be used for any of the components including the ring gear as well. Motors 1003 may be any known motors including brushless DC motors, brushed DC motors, stepper motors, servo motors, AC motors, pneumatic motors, hydraulic motors, or any other type of motor.

Ring gear 1002, as illustrated in FIG. 4, may be rigidly attached to blade 1001 by any known adhesive, friction fit, any other interference fit, rivets, bolts or any other known attachment method. In one embodiment, blade 1001 and the ring gear may each have one or more load transfer features. For example, the blade 1001 and ring gear could comprise lobes, keys, teeth, or another suitable load transfer feature. Furthermore, the ring gear 1002 and the blade 1001 may be composed of one piece or multiple pieces.

In one alternative embodiment the ring gear 1002 may comprise a gear that is rigid in torque but compliant to local deflections resulting from rotor blade forces and moments. For example, if the axis of rotation of the motor output shaft becomes non-parallel to the rotor blade pitch axis—due to rotor blade loads, the compliant ring gear can accommodate the misalignment while still rigidly transferring torque. Other embodiments may comprise other compliant components—such as the pinion gears 1005.

Actuator control system 1010, shown in FIG. 4, may command the first and second electric motor 1003 to change the pitch of rotor blade 1001—by driving the ring gear 1002—while maintaining tension against the ring gear in both directions. Actuator control system 1010 may use a signal from motor rotary position sensor 1006 to compute a drive signal that will change rotor pitch a commanded amount and maintain sufficient force against the ring gear 1002 in both rotational directions such to eliminate backlash or to minimize backlash to a desired level. Additionally, actuator control system 1010 may receive a command signal from aircraft controller 1011. Aircraft controller 1011 may include a traditional helicopter cyclic control stick, a traditional helicopter collective control lever, a unified control input, a decoupled control system, an autonomous flight controller or any other suitable control.

Figure 6:
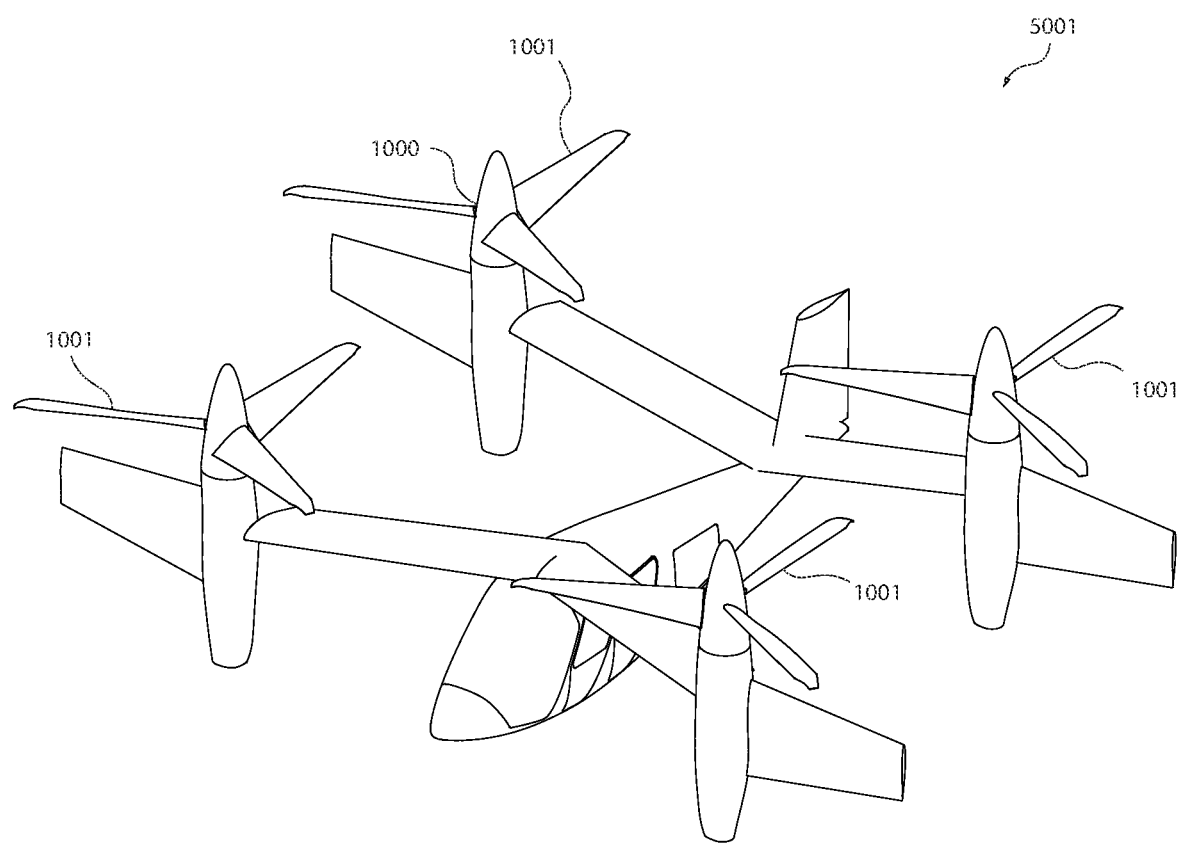
FIG. 6 illustrates an aircraft comprising an embodiment of a blade pitch actuator system.

One preferred embodiment of the present invention is configured to be used in a vertical takeoff and landing vehicle (VTOL), such as the tilt-rotor aircraft 5001 illustrated in FIG. 6. Embodiments of the present invention may be ideal for controlling the blade pitch of a VTOL rotorblade. Furthermore, some embodiments are ideally suited for individual blade control systems on VTOL aircraft—for example helicopters and tilt-rotor aircraft. Actuator control system 1010 may be configured to command the first motor 1003 and the second motor 1003 to drive ring gear 1002 to adjust blade pitch. Some embodiments contained herein will be ideally suited for implementation of individual blade control on aircraft such as those disclosed in U.S. Pat. No. 10,351,235 to Karem, incorporated herein by reference in entirety.

Figure 5:
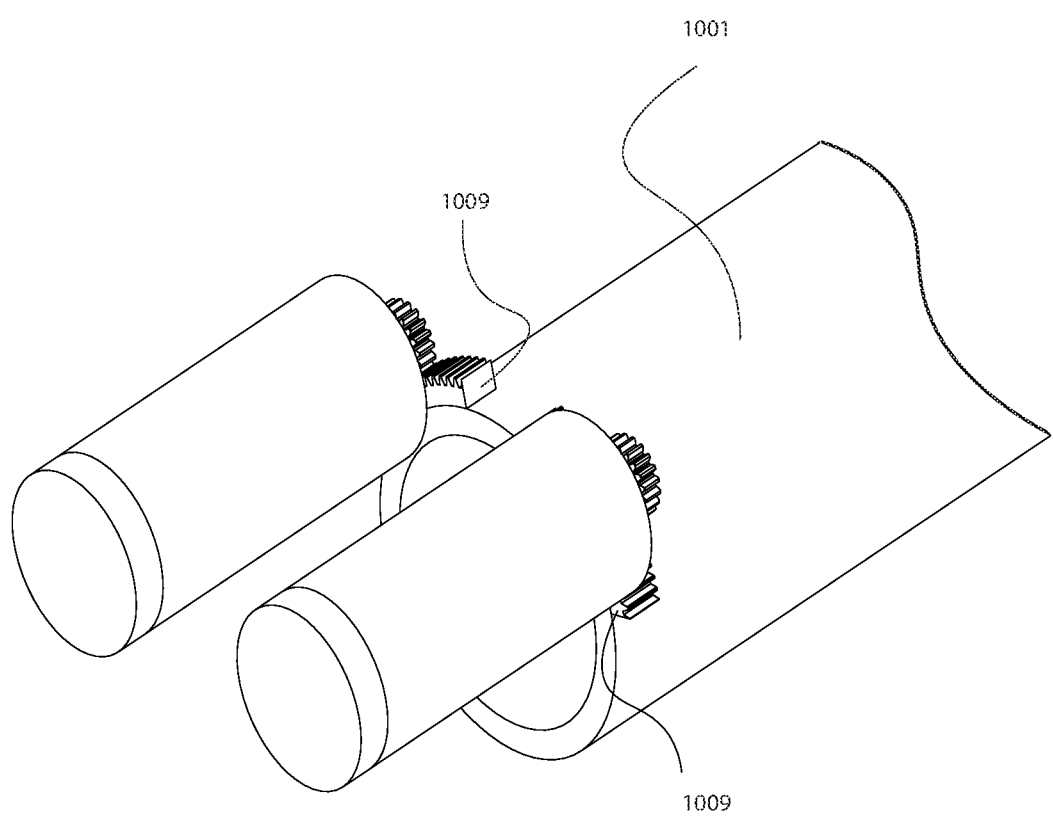
FIG. 5 illustrates an alternative embodiment of a blade pitch actuator system.

As illustrated in FIG. 5, in some embodiments ring gear 1002 may be replaced by multiple ring gear sections 1009. The embodiment of FIG. 5 has the benefit of redundancy. If a first ring gear section comes loose from blade 1001, or otherwise fails, the second motor 1003 can still control pitch by driving the second ring gear section 1009. It should be understood that there could be any number of ring gear sections and corresponding motors per blade, for example 2, 3, or 4. Alternative embodiments may include multiple ring gears or ring gear sections at different locations along the pitch axis. For example, a first ring gear may be located at a first radial station along the pitch axis and a second ring gear may be located at a second radial station along the pitch axis of the aircraft.

Figure 7:
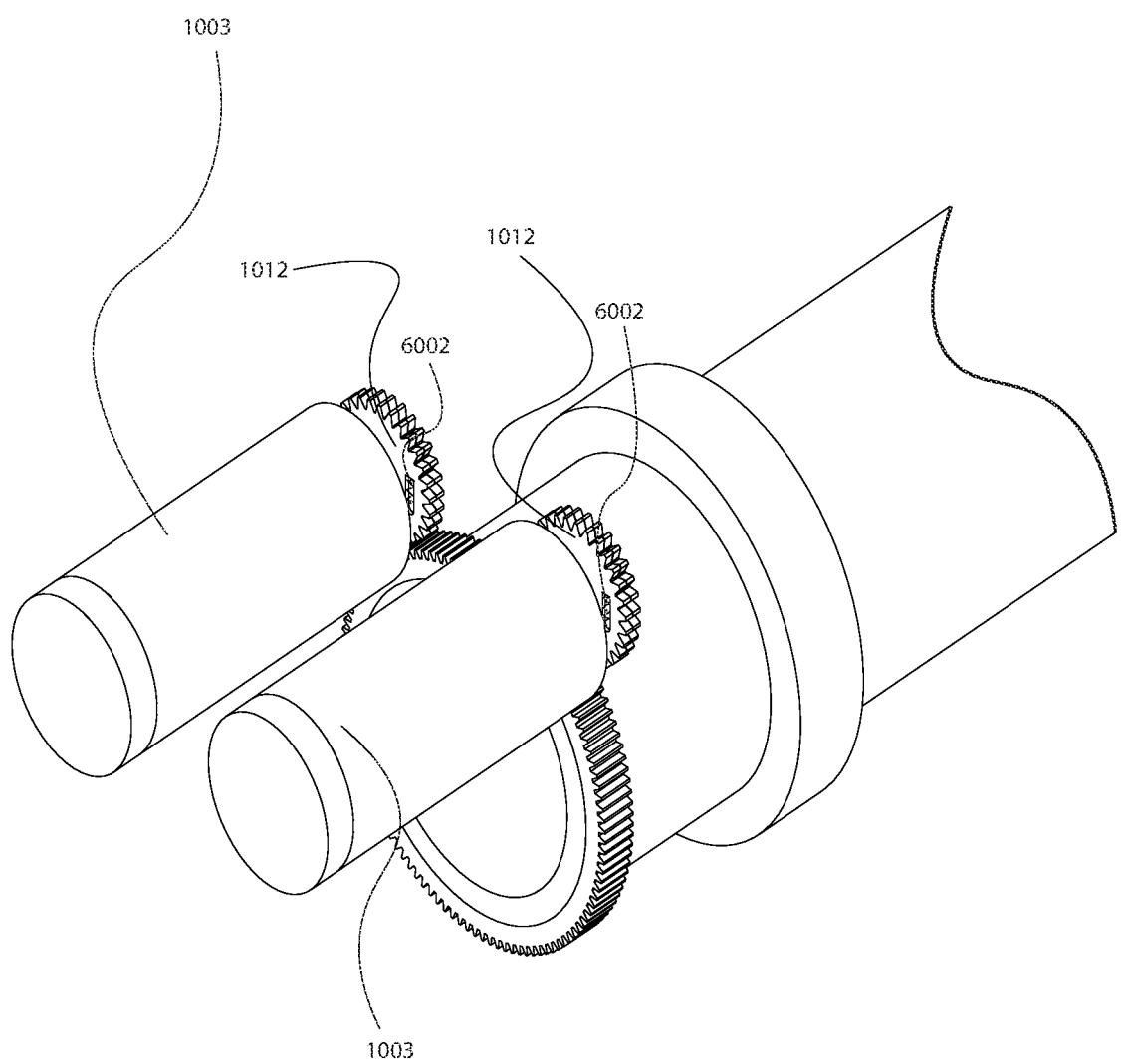
FIG. 7 illustrates an alternative embodiment of a blade pitch actuator system including anti-backlash pinion gears.

In one embodiment, a single motor 1003 may be used. An anti-backlash gear, such as anti-backlash gear 1012—shown in FIG. 7—may be used to eliminate or minimize backlash. Conventional anti-backlash gears 1012 have a first and a second anti-backlash gear section that are sprung in opposite directions. In one embodiment, spring 6002 provides a spring force. The two sections are configured such that one or more teeth of each of the two anti-backlash gear 1012 sections applies pressure to the ring gear in approximately opposite rotational directions.

Some of the embodiments contained herein may have favorable fail-operable characteristics. For example, if an embodiment such as the one illustrated in FIG. 7 had a motor 1003 fail, the second motor 1003 could continue to control pitch. If the embodiment comprises anti-backlash gears 1012, the anti-backlash gear 1012 being driven by the operable motor could minimize backlash. In an embodiment not comprising anti-backlash gears 1012 or other secondary backlash minimizing device, the system may be configured such that flight could be maintained for some period of time without catastrophic effects, although some backlash may be present in the blade pitch control in such a scenario.

In one embodiment, the first motor 1003 and the second motor 1003 may be fixed to the blade 1001 and the ring gear 1002 may be fixed to the rotor hub. In such an embodiment, the first and second motors 1003 may rotate with rotor blade 1001 as the blade changes pitch. The ring gear may stay fixed relative to the blade hub 1013.

Figure 8:
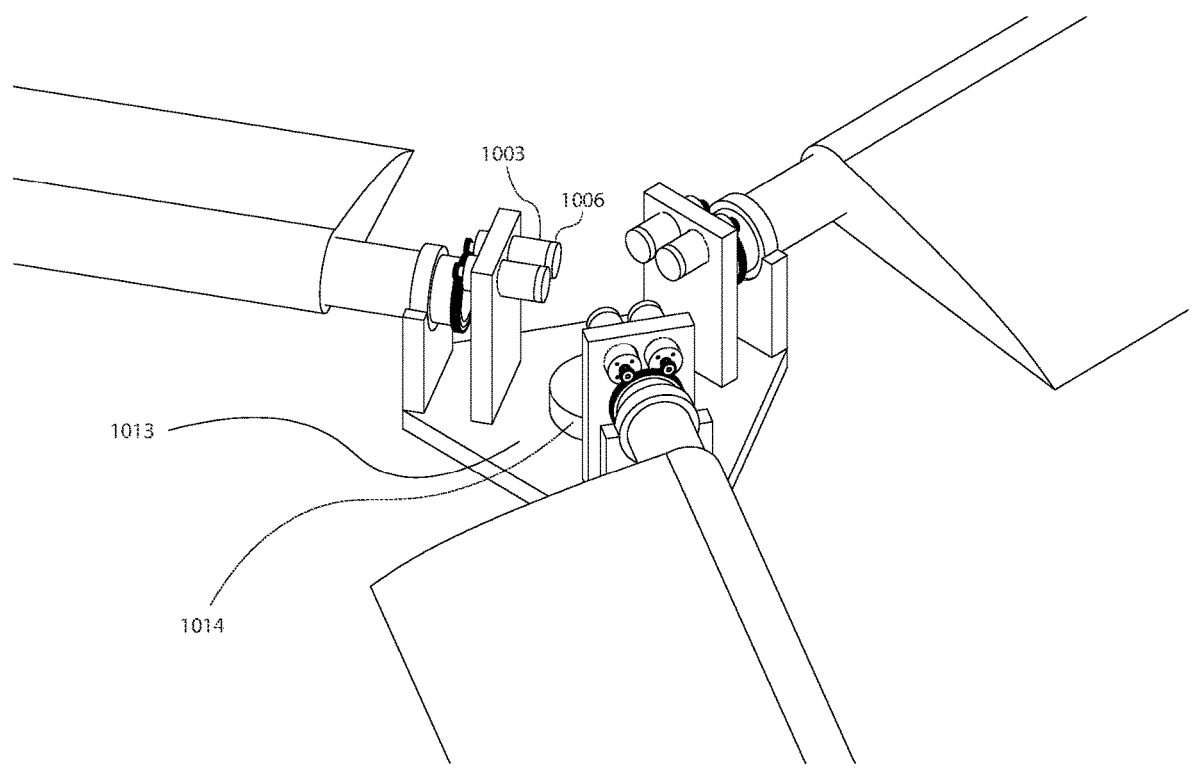
FIG. 8 illustrates an embodiment of a blade pitch actuator system including a hub and a slip ring.

Shown in FIG. 8 is a slip ring 1014. A slip ring 1014 may be used to provide power and control signals to and from the rotor hub. Power and signals can also be provided to the motors 1003, motor position sensors 1006 and any devices that rotate with the hub. In some embodiments, instead of using a slip ring to provide power for motors 1003, one or more generators may be used to generate electrical power to power electric motors 1003. This may be advantageous as opposed to a slip ring as transmitting higher power via slip rings can have challenges such as less than ideal reliability.

An embodiment of the currently disclosed invention may comprise multiple motors 1003 and anti-backlash gears 1012 including 2, 3, 4, 5 or any other suitable number.

Embodiments of the currently disclosed invention may be used with a rigid rotor system, a rigid hingeless rotor system, a fully articulated rotor, a partially articulated rotor, or any other type of rotor or propeller system. In an embodiment with lead-lag and flap hinges the actuator may preferably be located on the outboard side of the hinges. However, the actuator could be located inboard of the hinges or interposed in between the outboard and inboard side of the hinges.

One embodiment may use only one motor 1003. In such an embodiment, motor 1003 may drive two idler gears which in turn drive ring gear 1002. In such an embodiment the first and second idler gears may be anti-backlash gears—configured to mechanically apply a tensioning force in opposite directions against the motor side gear 1005 and ring gear 1002. Alternatively, the ring gears or pinion gears may be anti-backlash gears.

In some embodiments, the rotation axis of the motors is not parallel with the pivot axis of the actuated component.

For example, the motor may be configured in a non-parallel orientation relative to the pivot axis of the actuated component and the pinion gears and ring gears may be beveled gears.

It should be recognized that concepts taught herein can equally apply to propellers, rotors or prop-rotors whether used in a helicopter, airplane, or tilt-rotor aircraft. The term rotor should be understood to encompass rotor, propeller, and proprotor. Additionally, rotor blade should be understood to encompass rotor blade, propeller blade, and proprotor blade. For example, embodiments could be used to implement independent blade control on a turboprop. Such an implementation could reduce noise and vibrations in various flight conditions.

Embodiments of the currently disclosed invention may be configured to actuate aspects of an aircraft other than a rotor blade pitch—for example, a control surface. Embodiments may be configured to actuate tilting nacelles, ailerons, flaperons, rudders, rotor gimbals, tilting rotors, tilting wings, tilting wing sections, or any other known control surface or actuated component on an aircraft. In some embodiments, the actuator control system is configured to command the first and second actuator to control a vehicle dynamic, while also eliminating or minimizing backlash in the actuator system.

One embodiment may translate rotary action into linear motion. For example, a link may be pivotally attached to the ring gear. An actuator control system 1010 could command motors to drive the ring gear while collectively maintaining sufficient pressure against the ring gear in both directions to eliminate or minimize backlash. The ring gear is configured to drive a linkage, which is pivotally attached to the ring gear, with a component of motion along an axis. In alternative embodiments, the ring gear may be configured to actuate a cable. A spool may be connected to the ring gear such that actuator controller 1018 may command motors 1003 to actuate a cable.

Figure 9:
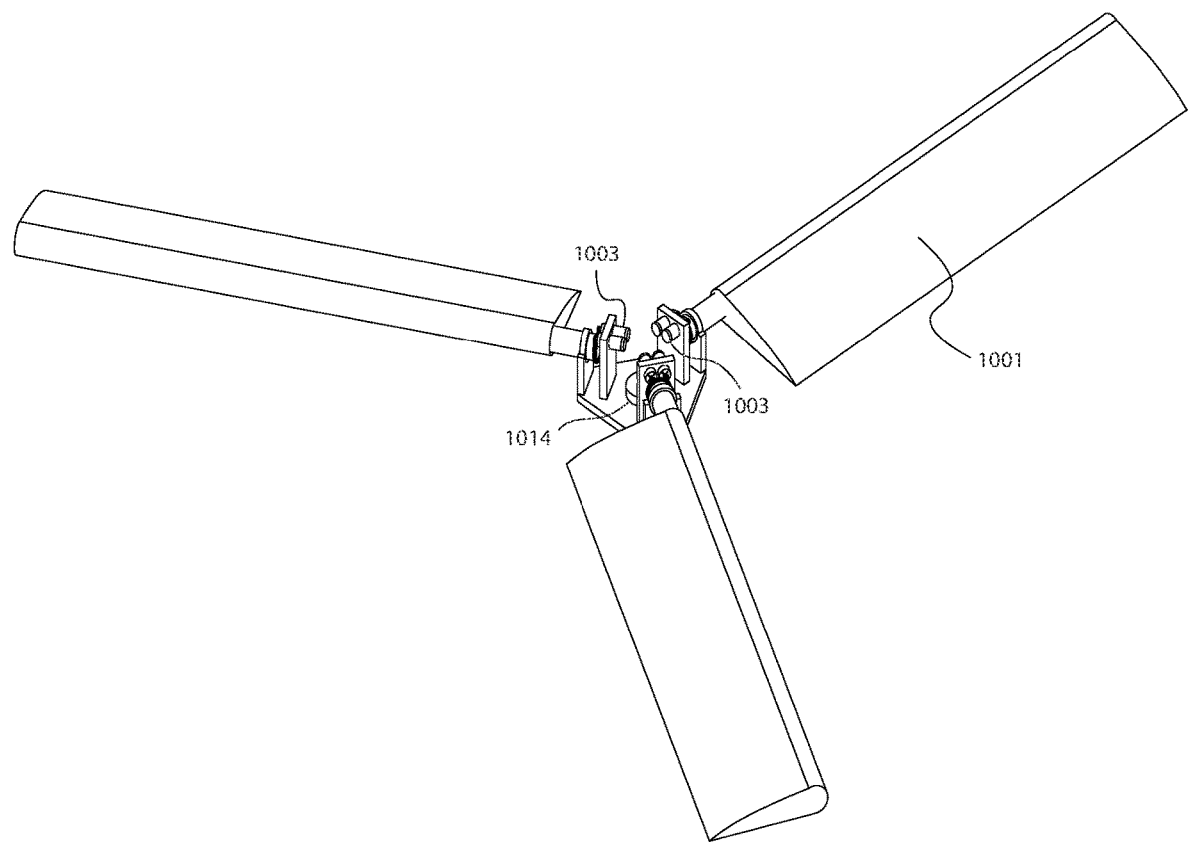
FIG. 9 illustrates an embodiment of a blade pitch actuator system; the blades are shown.

FIG. 9 illustrates the same embodiment as FIG. 8. FIG. 9 additionally shows the entire length of blades 1001. It should be understood any suitable rotor, propeller, or other blade can be used.

Figure 10:
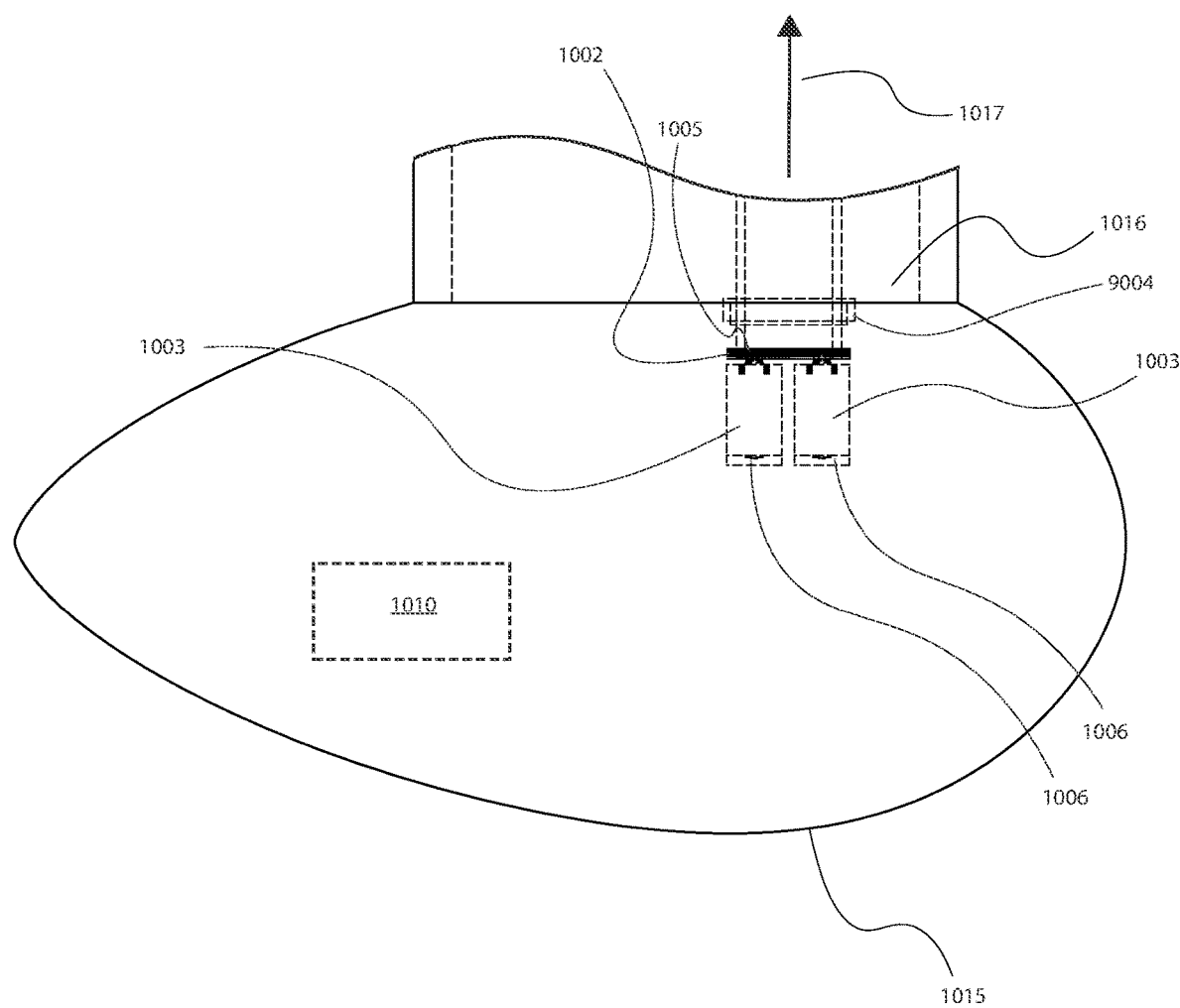
FIG. 10 illustrates an embodiment of a nacelle tilt actuator system.

In some embodiments such as the embodiment of FIG. 10, a nacelle may be actuated. Motors 1003 may be fixed relative to nacelle 1015. Actuator control system 1010—which should be understood to be located anywhere—may command motors 1003 to rotate the nacelle 1015. Motors 1003 drive pinion gears 1005. The pinion gears 1005 drive ring gear 1002, while collectively maintaining sufficient force against the ring gear in both rotational directions to eliminate or minimize backlash. A nacelle tilt bearing 9004 may be used. The system is configured such that the nacelle tilts about a nacelle pivot axis 1017 when motors 1003 drive ring gear 1002.

FIG. 11 illustrates one embodiment of a method 3000 by which actuator control system 1010 can control the blade pitch of rotor blades 1001. In step 3001, the actuator control system 1010 can receive a command from the aircraft controller to actuate rotor blade pitch. In step 3002, the actuator control system 1010 senses the position of the respective pair of motors 1003 by receiving a signal from resolvers 1006. In step 3003, the actuator control system computes commands for the first and second motor 1003 using the sensed value. The computed commands are configured to command the first motor to actuate the rotor pitch while the second motor maintains sufficient opposing force on the ring gear to eliminate or minimize backlash from the pitch control system. In step 3005, the actuator control system 1010 senses the position of the motors 1003 a second time. It should be understood these steps may be performed in different orders in different embodiments.

Figure 12:
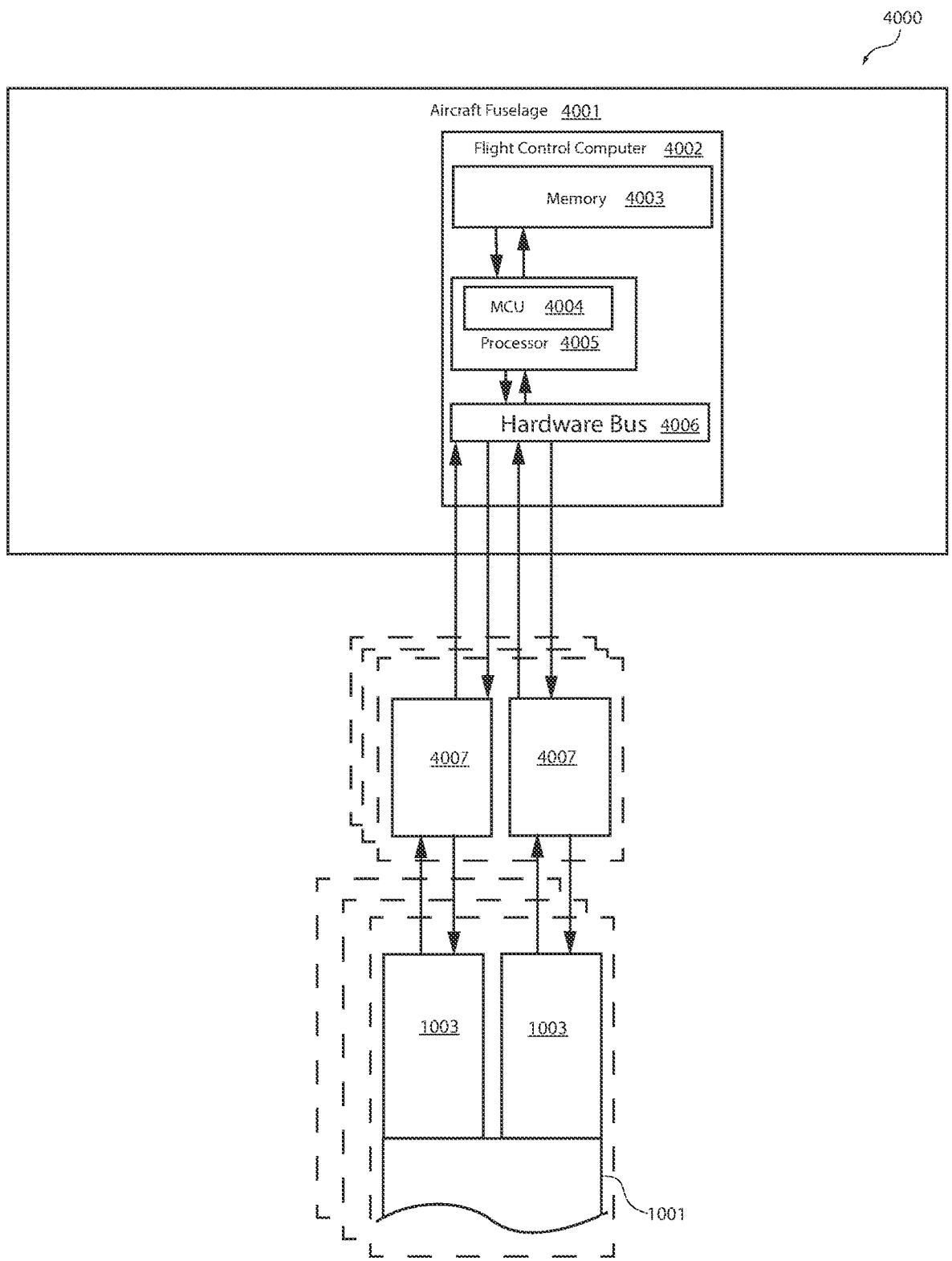
FIG. 12 illustrates an embodiment of hardware for implementing an embodiment of an anti-backlash pitch actuator system.

FIG. 12 illustrates one embodiment of a hardware system 4000 that can be used to implement an anti-backlash blade pitch actuation system. The fuselage 4001 comprises flight control computer 4002. Flight control computer 4002 comprises memory 4003, processor 4005, and hardware bus 4006. The processor 4005 is in communication with memory 4003 and hardware bus 4006. The hardware bus communicates with motor controllers 4007. Motor controllers 4007 are configured to control motor 1003. There can be any number of sets of motor controllers and rotor blades 1001. The number of sets will depend on how many blades the rotor has—for example 2, 3, 4, or 5.

It should be noted that any language directed to an actuator control system should be read to include any suitable combination of computing devices, including servers, interfaces, systems, databases, agents, peers, engines, controllers, or other types of computing devices operating individually or collectively. The computing devices may comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed above with respect to the disclosed apparatus. In some embodiments, various servers, systems, databases, or interfaces may exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Furthermore, the aircraft controller may include any suitable combination of computing devices, including servers, interfaces, systems, databases, agents, peers, engines, controllers, or other types of computing devices operating individually or collectively.

Aspects of the actuator control system may be located somewhere on the aircraft on which the actuator is located or anywhere else including in a ground-based control center, on other aircraft, or even in components of the actuator itself. Furthermore, in some embodiments the aircraft controller and the actuator control system may be implemented in distinguishable units or may be combined in one unit.

What is claimed is:

1. An aircraft rotor blade pitch actuator operationally coupled to a rotor blade of an aircraft rotor, the aircraft rotor blade pitch actuator comprising:
   a first motor configured to drive a first pinion gear;
   a second motor configured to drive a second pinion gear;
   a ring gear; and
   an actuator control system comprising at least one processor configured to execute software instructions to cause the actuator control system to command the first motor to drive the first pinion gear in a first direction against the ring gear to change a blade pitch angle of the rotor blade while commanding the second motor to drive the second pinion gear in a second direction against the ring gear to reduce backlash.

2. The aircraft rotor blade pitch actuator of claim 1, wherein the actuator control system uses a signal from a rotary position sensor to compute a signal to change the blade pitch angle a commanded amount and maintain sufficient force against the ring gear to minimize backlash.

3. The aircraft rotor blade pitch actuator of claim 1, wherein the rotor blade pitch actuator is configured for use on a tilt-rotor aircraft.

4. The aircraft rotor blade pitch actuator of claim 1, wherein the aircraft rotor is configured for individual blade control.

5. The aircraft rotor blade pitch actuator of claim 1, wherein the first motor comprises a brushless DC motor.

6. The aircraft rotor blade pitch actuator of claim 1, wherein the ring gear is heat treated.

7. The aircraft rotor blade pitch actuator of claim 1, further comprising a slip ring configured to provide power and control signals to the first motor and the second motor.

8. The aircraft rotor blade pitch actuator of claim 1, wherein the first pinion gear and the second pinion gear comprise at least one of: a spur gear, a helical gear, a miter gear, a worm gear, a screw gear, a rack and pinion gear, or a beveled gear.

9. The aircraft rotor blade pitch actuator of claim 1, wherein the ring gear comprises at least one of: a spur gear, a helical gear, a miter gear, a worm gear, a screw gear, a rack and pinion gear, or a beveled gear.

10. The aircraft rotor blade pitch actuator of claim 1, wherein the actuator control system is further configured to, in the event of a failure of the first motor or the first pinion gear, command the second motor to drive the second pinion gear against the ring gear to change the blade pitch angle.

11. A method for controlling a blade pitch angle of a rotor blade, comprising:
   receiving, from an aircraft controller, a command to change the blade pitch angle;
   receiving, from at least one sensor, a first position of a first motor and a second position of a second motor;
   determining a first command for the first motor and a second command for the second motor based on the received first position and the received second position;
   commanding the first motor by the first command to drive a first pinion gear in a first direction against a ring gear to change the blade pitch angle; and
   commanding the second motor by the second command to drive a second pinion gear in a second direction against the ring gear to maintain an opposing force to reduce backlash.

12. The method of claim 11, further comprising:
   after commanding the first and second motors, receiving, from the at least one sensor, a third position of the first motor and a fourth position of the second motor.

13. The method of claim 11, wherein the aircraft controller is further configured to, in the event of a failure of the first motor or the first pinion gear, command the second motor to drive the second pinion gear against the ring gear to change the blade pitch angle.

* * * * *